United States Patent
Jeong et al.

(10) Patent No.: US 7,653,250 B2
(45) Date of Patent: Jan. 26, 2010

(54) ADJUSTING SAMPLING RATE FOR ENCODING

(75) Inventors: Hyeonkuk Jeong, San Jose, CA (US); Berkat Shing Tung, Sacramento, CA (US); Jim Normile, Los Altos, CA (US)

(73) Assignee: Apple Inc., Cupertino, CA (US)

(*) Notice: Subject to any disclaimer, the term of this patent is extended or adjusted under 35 U.S.C. 154(b) by 380 days.

(21) Appl. No.: 11/118,554

(22) Filed: Apr. 28, 2005

(65) Prior Publication Data

US 2006/0244816 A1 Nov. 2, 2006

(51) Int. Cl.
*G06K 9/36* (2006.01)
*H04N 7/14* (2006.01)
*H04L 12/16* (2006.01)
*H04Q 11/00* (2006.01)

(52) U.S. Cl. .............. 382/232; 348/14.01; 718/100; 709/231; 370/265; 715/719

(58) Field of Classification Search ........... 382/232; 348/14.01–14.16; 718/100, 102; 709/231, 709/203; 370/260–271; 715/719–726
See application file for complete search history.

(56) References Cited

U.S. PATENT DOCUMENTS

| | | | | |
|---|---|---|---|---|
| 4,441,151 A | * | 4/1984 | Hayashibe | 700/37 |
| 4,558,430 A | * | 12/1985 | Mogami et al. | 714/48 |
| 4,602,326 A | * | 7/1986 | Kraus | 700/38 |
| 4,847,829 A | | 7/1989 | Tompkins et al. | |
| 5,319,682 A | * | 6/1994 | Clark | 375/240 |
| 5,604,738 A | | 2/1997 | Shibata et al. | |
| 5,826,083 A | * | 10/1998 | Prasad | 718/105 |
| 5,838,664 A | * | 11/1998 | Polomski | 370/263 |
| 5,896,128 A | | 4/1999 | Boyer | |
| 5,933,417 A | | 8/1999 | Rottoo | |

(Continued)

FOREIGN PATENT DOCUMENTS

EP 750236 A2 * 12/1996

(Continued)

OTHER PUBLICATIONS

Zhanjun et al., "The guarantee of QoS for Wireless Multimedia Streams Based on Adaptive Session", Dec. 2000, IEEE International Conference on Personal Wireless Communications, pp. 283-287.*

(Continued)

*Primary Examiner*—Aaron W Carter
(74) *Attorney, Agent, or Firm*—Adeli & Tollen LLP

(57) ABSTRACT

Some embodiments provide a method for adjusting a video sampling rate during an video encoding operation. The method receives a metric that quantifies the usage of a computer that performs the video encoding operation. The method computes an adjustment factor based on the metric. In some embodiments the metric is a system idle time. The method defines the video sampling rate based on the adjustment factor. Some embodiments compute the adjustment factor by performing a non-linear operation based on the metric. In some embodiments, the non-linear operation includes performing an integral operation based on the metric. In some embodiments, the non-linear operation includes performing a derivative operation based on the metric. Some embodiments perform more than one operation to compute the adjustment factor. In some embodiments, each operation is assigned a weight.

33 Claims, 6 Drawing Sheets

U.S. PATENT DOCUMENTS

| | | | |
|---|---|---|---|
| 5,953,049 A | | 9/1999 | Horn et al. |
| 5,964,842 A | * | 10/1999 | Packard ............... 709/247 |
| 6,167,432 A | | 12/2000 | Jiang |
| 6,311,224 B1 | * | 10/2001 | Packard ............... 709/247 |
| 6,487,578 B2 | * | 11/2002 | Ranganathan ........... 718/104 |
| 6,496,216 B2 | | 12/2002 | Feder |
| 6,629,075 B1 | * | 9/2003 | Schalkwyk ............. 704/270 |
| 6,633,985 B2 | | 10/2003 | Drell |
| 6,697,341 B1 | | 2/2004 | Roy |
| 6,697,476 B1 | | 2/2004 | O'Malley |
| 6,728,221 B1 | | 4/2004 | Shaffer et al. |
| 6,744,460 B1 | | 6/2004 | Nimri |
| 6,757,005 B1 | | 6/2004 | Elbaz |
| 6,760,749 B1 | | 7/2004 | Dunlap |
| 6,882,971 B2 | | 4/2005 | Craner |
| 6,989,856 B2 | | 1/2006 | Firestone et al. |
| 7,096,037 B2 | | 8/2006 | Canova, Jr. et al. |
| 7,266,091 B2 | | 9/2007 | Singh et al. |
| 7,321,382 B2 | | 1/2008 | Okajima et al. |
| 7,474,326 B2 | | 1/2009 | Le Pennec |
| 2001/0019354 A1 | | 9/2001 | Einarsson et al. |
| 2002/0126626 A1 | | 9/2002 | Singh et al. |
| 2004/0028199 A1 | | 2/2004 | Carlson |
| 2004/0233990 A1 | | 11/2004 | Sekiguchi et al. |
| 2004/0257434 A1 | | 12/2004 | Davis et al. |
| 2005/0018828 A1 | | 1/2005 | Nierhaus et al. |
| 2005/0099492 A1 | | 5/2005 | Orr |
| 2005/0286443 A1 | | 12/2005 | McMillen et al. |
| 2006/0029092 A1 | | 2/2006 | Luo et al. |
| 2006/0244812 A1 | | 11/2006 | Jeong et al. |
| 2006/0244819 A1 | | 11/2006 | Pun et al. |
| 2006/0245377 A1 | | 11/2006 | Jeong et al. |
| 2006/0245378 A1 | | 11/2006 | Jeong et al. |
| 2006/0245379 A1 | | 11/2006 | Abuan et al. |
| 2006/0247045 A1 | | 11/2006 | Jeong et al. |

FOREIGN PATENT DOCUMENTS

| | | |
|---|---|---|
| EP | 1875769 | 1/2008 |
| EP | 1877148 | 1/2008 |
| EP | 1878229 | 1/2008 |
| EP | 1936996 | 6/2008 |
| WO | WO 2004030369 A1 * | 4/2004 |
| WO | WO 2006116644 | 11/2006 |
| WO | WO 2006116659 | 11/2006 |
| WO | WO 2006116750 | 11/2006 |

OTHER PUBLICATIONS

Wong et al., "PID-based Real-time Rate Control", Jun. 2004, IEEE Conference on Multimedia and Expo, vol. 1, pp. 221-224.*

U.S. Appl. No. 10/877,507, filed Jun. 25, 2004, Bruce Arthur, et al.

International Search Report, Apple Computer, Inc., Sep. 18, 2006, International Search Report of PCT Application PCT/US2006/016469, which is related to this application.

Written Opinion of the International Searching Authority, Apple Computer, Inc., Sep. 18, 2006, Written Opinion of the International Searching Authority of PCT Application PCT/US2006/016469, which is related to this application.

Restriction Requirement of U.S. Appl. No. 11/118,553, filed Nov. 8, 2006, Jeong, Hyeonkuk, et al., Oct. 7, 2008 (mailing date).

Non-Final Rejection of U.S. Appl. No. 11/118,555, filed Nov. 8, 2006, Hyeonkuk Jeong, et al., Jun. 25, 2008 (mailing date).

International Search report and Written Opinion of PCT/2006/016123, Sep. 26, 2008 (mailing date), Apple Computer, Inc.

International Preliminary Report on Patentability and Written Opinion for PCT/US2006/016469, Oct. 30, 2007 (mailing date), Apple Computer, Inc.

International Search Report and Written Opinion of PCT/US2006/016169, Oct. 16, 2008 (mailing date), Apple Computer Inc.

Non-Final Office Action of U.S. Appl. No. 11/118,931, filed Nov. 8, 2006, Jeong, Hyeonkuk, et al., Feb. 3, 2009 (mailing date).

Non-Final Office Action of U.S. Appl. No. 11/118,932, filed Nov. 8, 2006, Abuan, Joe, et al., Apr. 29, 2009 (mailing date).

Non-Final Office Action of U.S. Appl. No. 11/118,555, filed Nov. 8, 2006, Jeong, Hyeonkuk, et al., Feb. 12, 2009 (mailing date).

Non-Final Rejection of U.S. Appl. No. 11/118,297, filed Nov. 8, 2006, Hyeonkuk Jeong, et al., Jan. 27, 2009 (mailing date).

Non-Final Office Action of U.S. Appl. No. 11/118,553, filed Nov. 8, 2006, Jeong, Hyeonkuk, et al., Feb. 4, 2009 (mailing date).

Non-Final Office Action of U.S. Appl. No. 11/118,615, filed Nov. 8, 2006, Pun, Thomas, et al., Mar. 31, 2009 (mailing date).

International Preliminary Report on Patentability and Written Opinion of PCT/US2006/016169, Dec. 11, 2008 (mailing date), Apple Computer Inc.

* cited by examiner

ADJUSTING SAMPLING RATE FOR ENCODING

CROSS REFERENCE TO RELATED APPLICATIONS

This Application is related to the following applications: U.S. patent application Ser. No. 11/118,931, filed Apr. 28, 2005; U.S. patent application Ser. No. 11/118,932, filed Apr. 28, 2005; U.S. patent application Ser. No. 11/118,555, filed Apr. 28, 2005; U.S. patent application Ser. No. 11/118,297, filed Apr. 28, 2005; U.S. patent application Ser. No. 11/118,553, filed Apr. 28, 2005; and U.S. patent application Ser. No. 11/118,615, filed Apr. 28, 2005.

FIELD OF THE INVENTION

The present invention is directed towards adjusting sampling rate for encoding.

BACKGROUND OF THE INVENTION

The transmission of video streams (e.g., High Definition ("HD") television programming, Internet video conferencing) often requires video encoding and decoding operations. In many cases, video encoding and decoding operations use video codecs (COmpressor-DECompressor). Video codecs are compression algorithms designed to encode/compress and decode/decompress video data streams to reduce the size of the streams for faster transmission and smaller storage space. While lossy, current video codecs attempt to maintain video quality while compressing the binary data of a video stream. A video stream comprises a sequence of video frames.

An encoder can sample video frames at different rates. Generally, a higher frame sampling rate translates to a higher quality video stream. However, high frame sampling rates make real time encoding of video streams impracticable or difficult. Processors often are unable to encode and transmit all the frames in real time (e.g., such as during video conferencing) because encoding operations are often computationally rigorous. Furthermore, processors often perform other applications while performing the encoding operation, which limits the processor's computing resources that can be allocated to the encoding operation.

Therefore, there is a need in the art for optimizing and changing the frame sampling rates during an encoding operation (e.g., during a video conference). Ideally, such an optimization method should ensure that video streams are encoded and transmitted in real time.

SUMMARY OF THE INVENTION

Some embodiments provide a method for adjusting a video sampling rate during a video encoding operation. The method receives a metric that quantifies the usage of a computer that performs the video encoding operation. The method computes an adjustment factor based on the metric. The method then defines the video sampling rate based on the adjustment factor.

In some embodiments the metric is a system idle time. Also, some embodiments compute the adjustment factor by performing a non-linear operation based on the metric that quantifies the usage of the computer. For instance, in some embodiments, the non-linear operation includes performing an integral operation and/or derivative operation based on the metric. Furthermore, some embodiments compute the adjustment factor as a weighted average of several operations, one or more of which can be a non-linear operation.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a method for adjusting a video sampling rate during a video encoding operation. The method receives a metric that quantifies the usage of a computer that performs the video encoding operation. The method computes an adjustment factor based on the metric. The method then defines the video sampling rate based on the adjustment factor.

In some embodiments the metric is a system idle time. Also, some embodiments compute the adjustment factor by performing a non-linear operation based on the metric that quantifies the usage of the computer. For instance, in some embodiments, the non-linear operation includes performing an integral operation and/or derivative operation based on the metric. Furthermore, some embodiments compute the adjustment factor as a weighted average of several operations, one or more of which can be a non-linear operation.

FIGS. 2-5 illustrate more detailed embodiments of the invention. However, before describing these embodiments in Sections II-III, a brief description is provided of the environment in which some embodiments are implemented.

I. Multi-participant Video Conference

Figure 1:
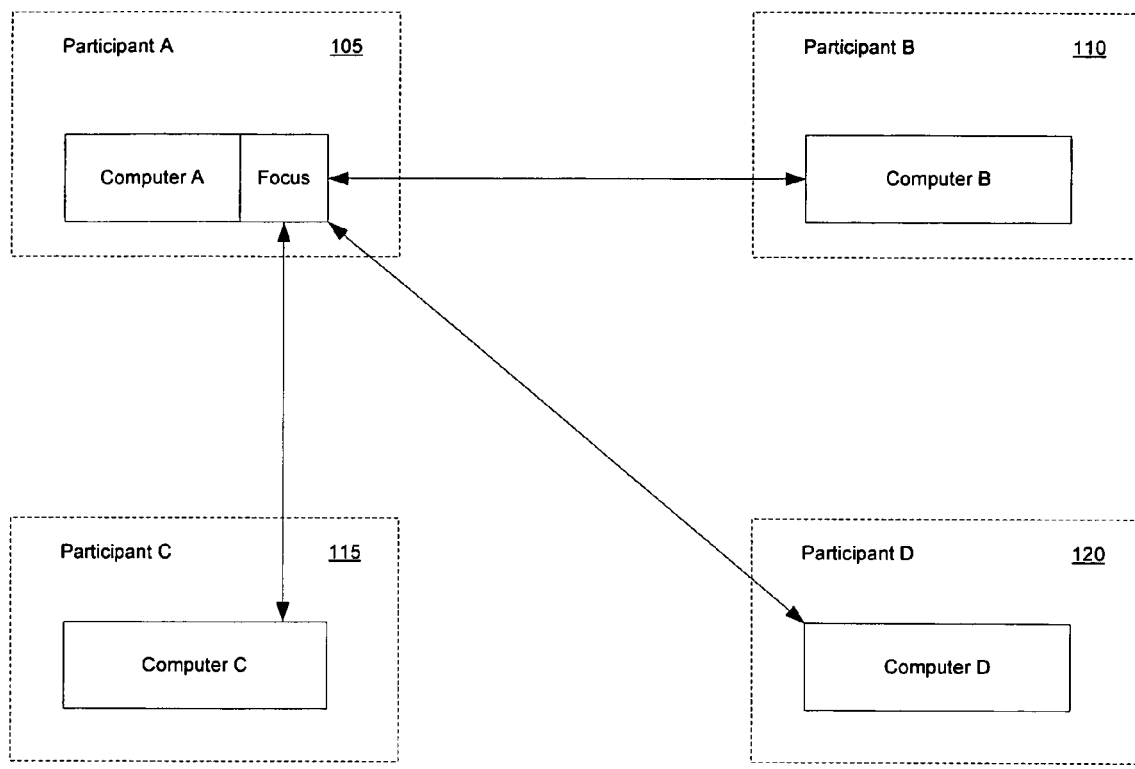
FIG. 1 illustrates a focus point configuration for a multi-point video conference.

Some embodiments of the invention are used in an environment that requires real time transmission of video, such as a video conferencing environment. FIG. 1 conceptually illustrates a multi-participant video conferencing environment that uses the invention. As shown in this figure, the multi-participant video conferencing environment includes four computers 105-120 of four participants A, B, C, and D of a video conference.

In the multi-participant video conference architecture illustrated in FIG. 1, one computer 105 serves as the central distributor of video content, and is therefore referred to as the focus point of the video conference. Specifically, each non-focus computer 110, 115, or 120 encodes its video data and sends its encoded video data to the focus computer 105. The focus computer 105 (1) decodes the received, encoded video content, (2) composites the decoded video content, (3) encodes the composite video content, and (4) distributes the encoded composite video content to the non-focus computers 110-120. These compositing and encoding operations are further described in U.S. patent application Ser. No. 11/118, 931 entitled "Video Processing in a Multi-Participant Video Conference", filed concurrently with the present application. This application is incorporated in the present application by reference.

Some embodiments of the invention are implemented by video-conference applications that perform the focus and non-focus operations of the focus and non-focus computers 105-120. These applications utilize the invention to adjust the frame sampling rate at which frames are sent to their respective encoders. In addition, as further described in the above application, the video-conference application of the focus-point computer uses the frame sampling rate to determine the rate at which the application should generate composite frames.

FIG. 1 illustrates one type of environment (e.g., multi-participant video conferencing) that uses the invention to adjust the frame sampling rate during an encoding operation. However, the invention is applicable to other encoding environments and other video conferencing environments.

II. Adjusting Frame Sampling Rate

Figure 2:
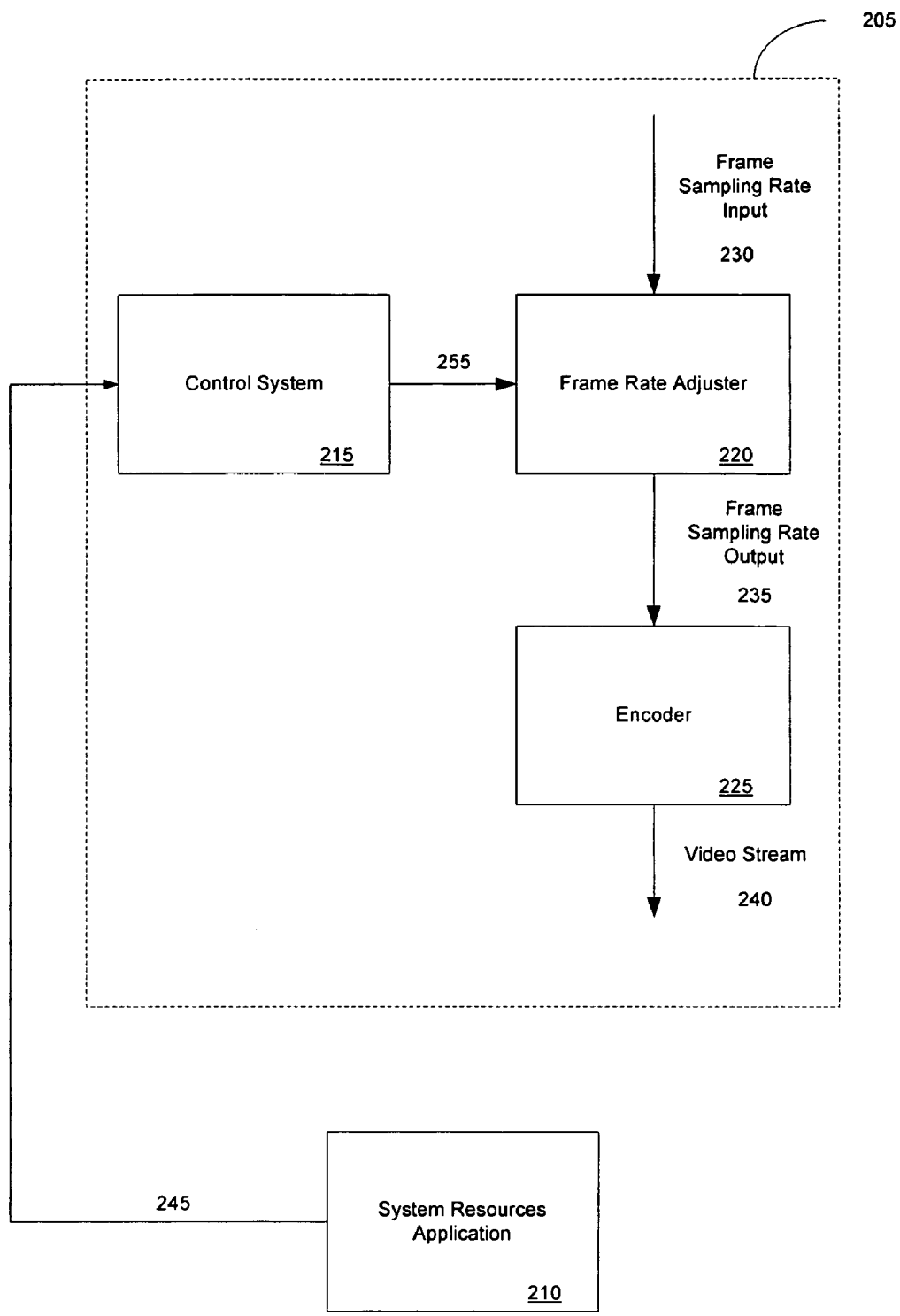
FIG. 2 illustrates a system configuration for adjusting frame sampling rate.

FIG. 2 conceptually illustrates a video encoding application 205 that implements some embodiments of the invention. In some embodiments, this video encoding application is part of a video conference application that performs focus or non-focus point operations. In other embodiments, however, this video encoding application 205 is used in another encoding environment.

As shown FIG. 2, the video encoding application 205 includes a control system 215, a frame rate adjuster 220, and one or more encoding modules 225. The control system 215 receives a system input 245 from a system resources application 210. The system resources application 210 monitors the usage of the resources of the computer, which performs the encoding operation. In some embodiments, the system input 245 indicates an idle time of one or more resources of the computer (e.g., the idle time of the computer's processor).

After receiving the system input 245 from the system resources application 210, the control system 215 computes an error value. In some embodiments, the error value represents a difference between a minimum system input (e.g., minimum idle time) and the system input 245. Based on the error value, the control system 215 computes an adjustment output 255, which it provides to the frame rate adjuster 220.

As shown in FIG. 2, the frame rate adjuster 220 receives the adjustment output 255 of the control system 215. Based on this output, the frame rate adjuster 220 defines the frame sampling rate for the encoding operation. In other words, this output causes the frame rate adjuster to increase, decrease, or keep constant the frame sampling rate.

As shown in FIG. 2, one or more encoding modules 225 of the video encoding application utilize the frame sampling rate to perform their operations. For instance, in some embodiments, one of these encoding module 225 is the actual encoder that encodes a video frame (e.g., encodes the frame as an intra-frame or an inter-frame). The frame sampling rate that is supplied to this encoder determines the rate at which the encoder produces encoded video frames. When the video-encoding application 205 is used by the video conferencing application of a focus-point computer 105 of FIG. 1, the frame sampling rate is also used to determine the rate at which the video conferencing application generates composite frames.

Figure 3:
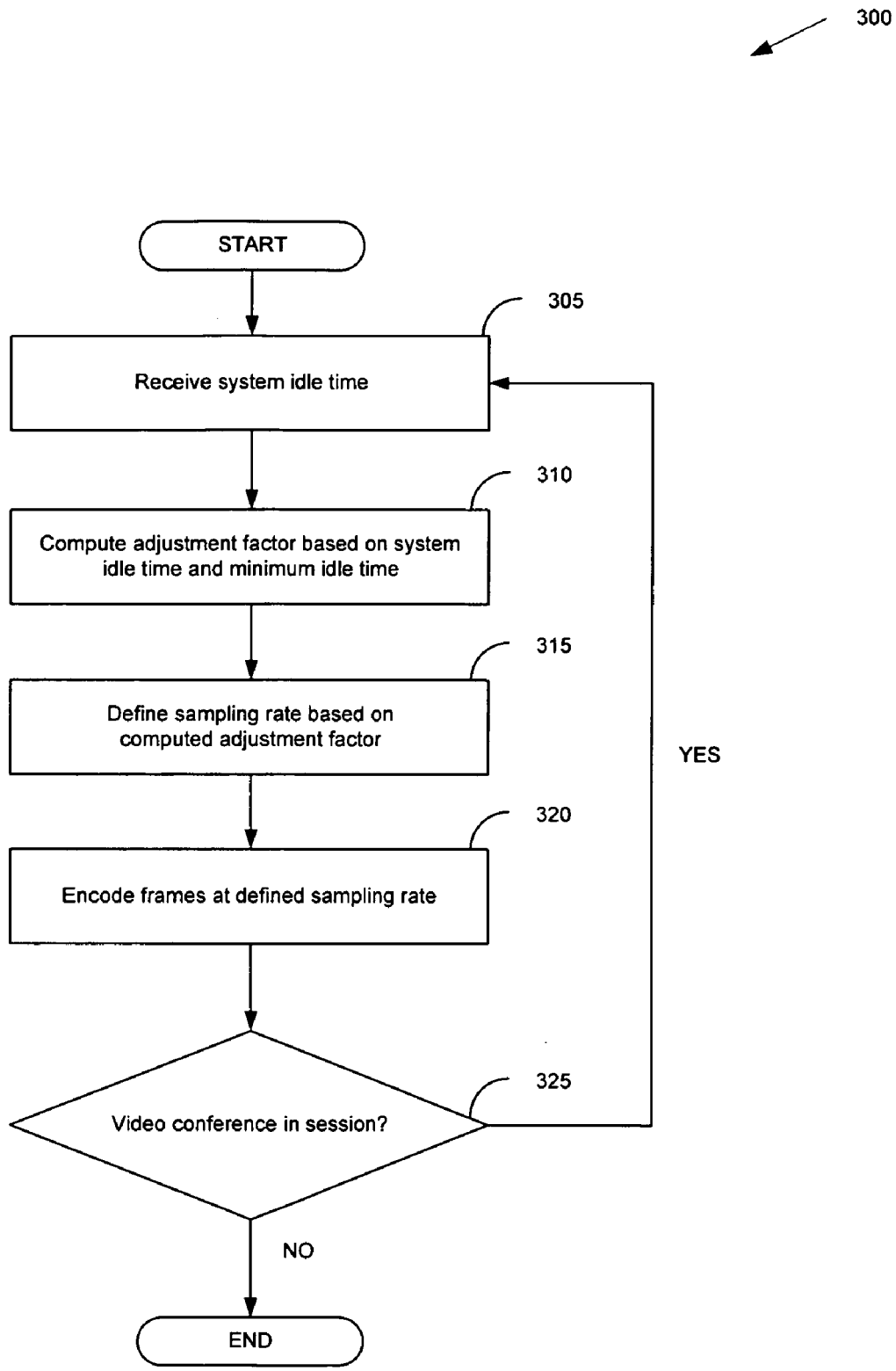
FIG. 3 illustrates a method for implementing a PID control system.

During an encoding operation, each of the components of the video encoding application 205 iteratively performs the above-described operations. To further elaborate on these iterative operations, FIG. 3 illustrates an iterative rate adjustment process 300 that is performed by the components of the video encoding application 205. As shown in FIG. 3, the rate adjustment process 300 start by the control system 215 receiving (at 305) the computer's idle time. In some embodiments, the control system 215 receives the computer's idle time (e.g., system input 245) from the system resources application 210. The control system 215 computes (at 310) an adjustment factor (e.g., adjustment output 255) based on the computer's idle time, which was received at 305.

Once the adjustment factor is computed (at 310), the frame rate adjuster 220 defines (at 315) a frame sampling rate based on the adjustment factor (e.g., adjustment output 255), which was provided by the control system 215. In some embodiments, defining (at 315) the frame sampling rate results in the frame rate adjuster 220 increasing, decreasing, or keeping constant the frame sampling rate.

After defining (at 315) the frame sampling rate, the frame sampling rate is utilized (at 320) by one or more encoding modules 225 of the encoding application 205. For instance, as mentioned above, the encoder 225 encodes (at 320) the frames at the frame sampling rate. Next, at 325, the video encoding application 205 determines (at 325) whether the video encoding operation should be terminated. For instance, when the video encoding application 205 is part of a video conferencing application, the process 300 determines whether the conference is still in session. If so, the process returns to 305 to receive a new system idle time. Otherwise, the rate adjustment process 300 ends.

One of ordinary skill will realize that the invention's frame rate adjustment might be implemented differently in other embodiments. For instance, some embodiments compute the adjustment factor 255 only when the system idle time is less than a particular threshold (e.g., ten percent). When the system idle time is more than the particular threshold, these embodiments use a predefined frame sampling rate. However, these embodiments perform the rate adjustment process 300 to possibly change the frame sampling rate when the system idle time is less than the particular threshold. Furthermore, when the system idle time changes to a level above the particular threshold, some embodiments compute an adjustment factor 255 that specifies the frame rate adjuster 220 to increase the frame sampling rate to a predefined frame sampling rate.

III. Proporational Integral Derivative ("PID") Control

Figure 4:
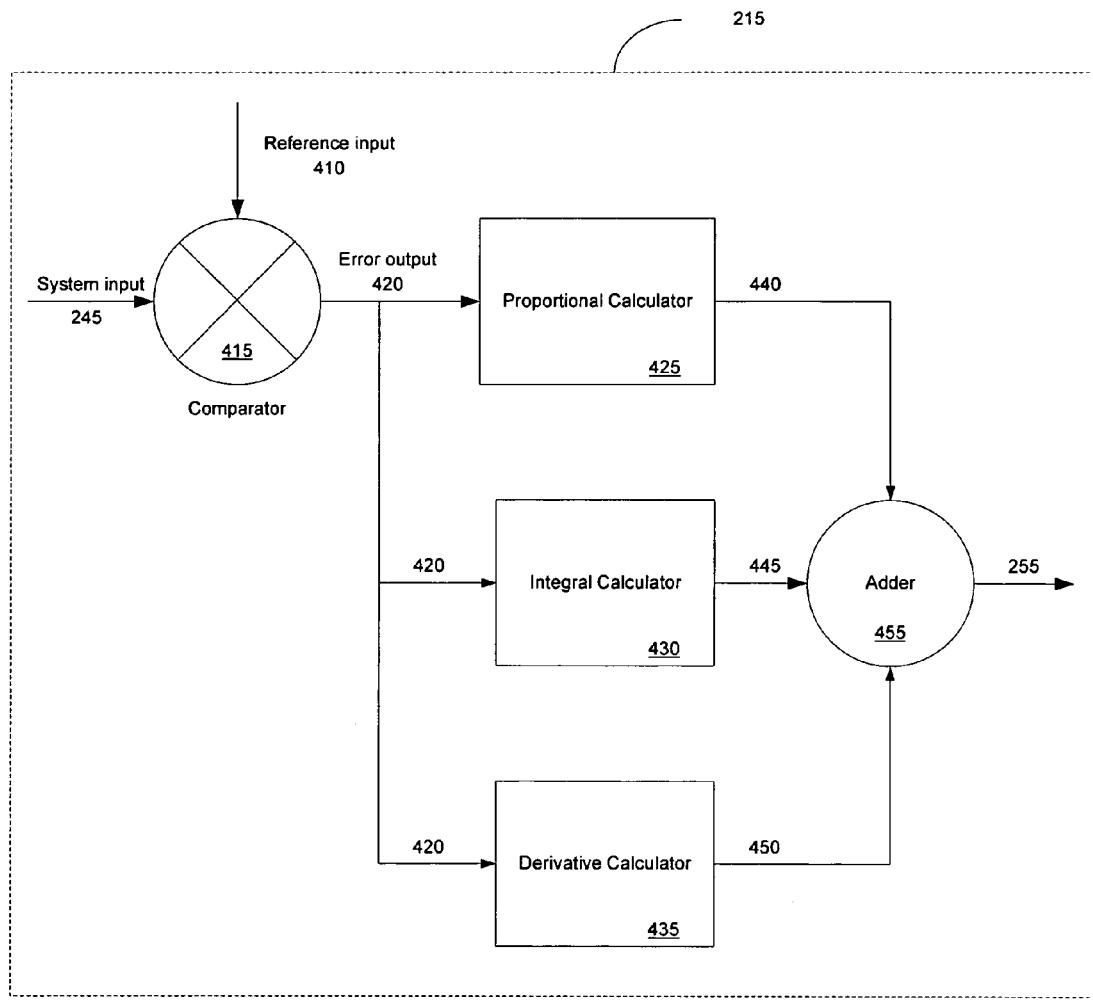
FIG. 4 illustrates a proportional integral derivative ("PID") control system.

As mentioned above, some embodiments of the video encoding application 205 include a control system 215. Different embodiments implement the control system 215 of FIG. 2 differently. FIG. 4 conceptually illustrates one implementation that is used by some embodiments of the invention. In this implementation of the invention, the control system 215 is a PID control system. The control system 215 may be implemented in any encoding environment (e.g., video conference application).

As shown in FIG. 4, the PID control system 215 includes a system input 245, a reference input 410, a comparator 415, an adder 455, and three calculation modules, which are a proportional calculator 425, an integral calculator 430, and a derivative calculator 435.

As further shown in this figure, the comparator 415 receives the system input 245 and the reference input 410. In some embodiments, the system input 245 represents the computer's idle time, while the reference signal 410 represents a minimum idle time for a computer that performs the encoding operation. The comparator 415 computes an error output 420 based on the system input 245 and the reference input 410. In some embodiments, the error output 420 reflects a difference between the system input 245 and the reference input 410. The comparator 415 provides the error output 420 to the proportional calculator 425, the integral calculator 430 and the derivative calculator 435.

After receiving the error output 420, the proportional calculator 425 computes an output 440 that is linearly proportional to the error output 420. In some embodiments, the proportional output 440 reflects the instantaneous value of the error output 420. Similarly, after receiving the error output 420, the integral calculator 430 computes an integral output 445. In some embodiments, the integral output 445 is the sum of the error output 420 over a particular period of time. Additionally, after receiving the error output 420, the derivative calculator 435 computes the derivative output 450. In some embodiments, the derivative output 450 reflects the rate of change in the error output 420.

All three computed outputs 440-450 are provided to the adder 455. The adder 455 computes the adjustment output 255 based on the three computed outputs 440-450. In some embodiments, the adjustment output 255 is computed by taking a weighted average of the proportional output 440, integral output 445 and derivative output 450. Different embodiments assign different weights to each computed output. Some embodiments compute the weighted average of the outputs by using the following equation:

$$A = \omega_i \kappa e + \omega_j \int e + \omega_k \frac{\partial}{\partial \tau} e \quad (1)$$

where A represents the adjustment output 255, e represents the error output 420, k represents a proportional multiplier, and $\omega_i$, $\omega_j$ and $\omega_k$ represent weight factors between 0 and 1. Some embodiments use 0.3 for $\omega_i$, 0.4 for $\omega_j$, and 0 for $\omega_k$.

Figure 5:
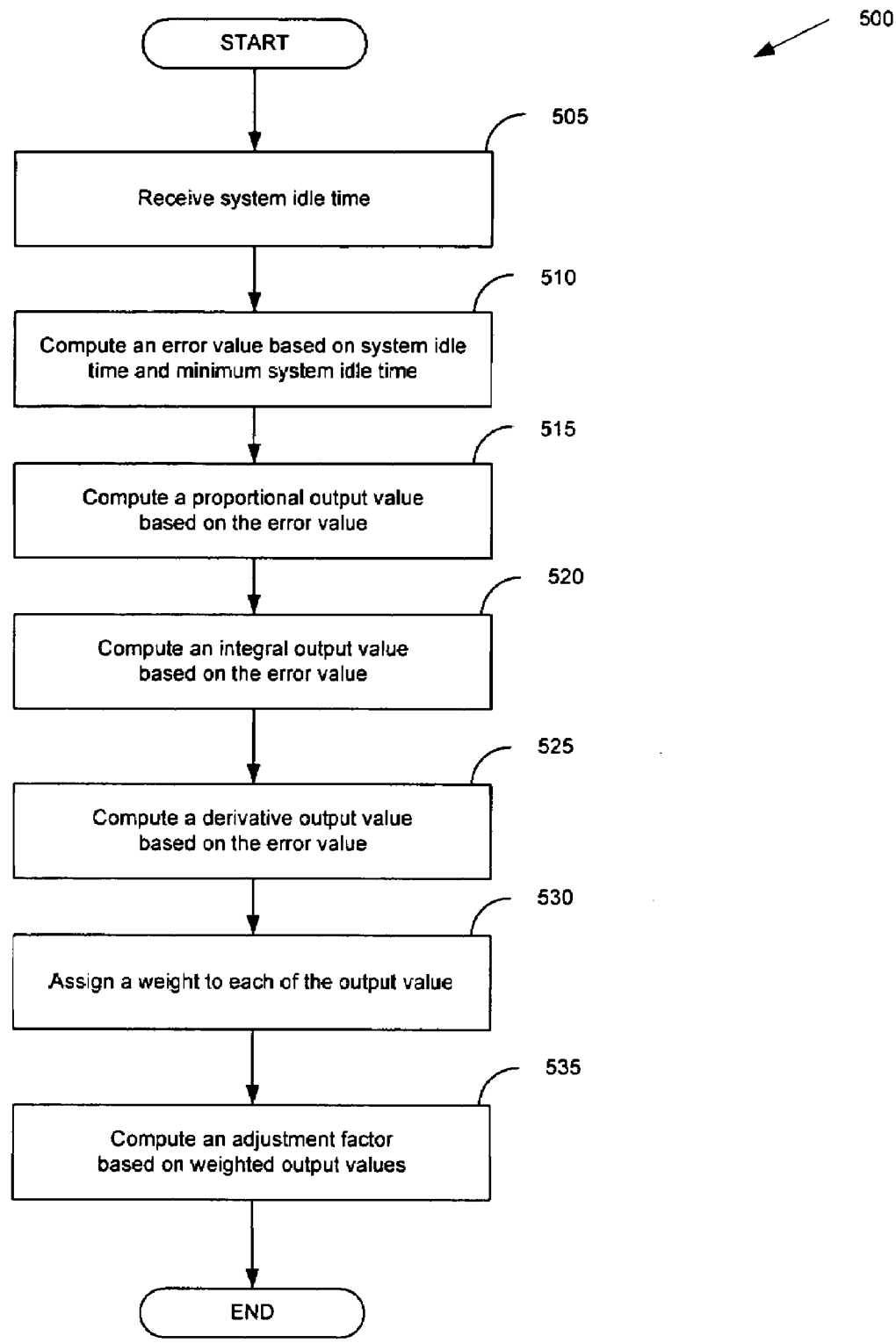
FIG. 5 illustrates a method for computing a response metric for adjusting a frame sampling rate.

In some embodiments, the operations that are described above for FIG. 4 are iteratively performed by the PID control system 215. To further elaborate on these above-described operations, FIG. 5 illustrates a flow through these operations. As shown in FIG. 5, the comparator 415 initially receives (at 505) a system idle time. The comparator 415 computes (at 510) an error value (e.g., error output 420) based on the system idle time (e.g., system input 245) of the computer that performs an encoding operation. In some embodiments, the error value is based on the difference the system idle and a minimum idle time (e.g., reference input 410).

After computing (at 510) the error value, the proportional calculator 425 computes (at 515) a proportional output value based on the error value (e.g., error output 420). In some embodiments, the proportional output value (e.g., proportional output 440) quantifies a proportional value of the error output 420. In some embodiments, the proportional calculator 425 computes the proportional output value after receiving the error output 420 from the comparator 415.

The integral calculator computes (at 520) an integral output value based on the error value (e.g., error output 420). In some embodiments, the integral output value (e.g., integral output 445) quantifies the sum of the several error values over a particular period of time. In some embodiments, the integral calculator 430 computes the integral output value after receiving the error output 420 from the comparator 415.

The derivative calculator 435 computes (at 525) a derivative output value based on the error value (e.g., error output 420). In some embodiments, the derivative output value (e.g., derivative output 450) quantifies the rate of change in the error value. In some embodiments, the derivative calculator 435 computes the derivative output value after receiving the error output 420 from the comparator 415.

After computing the derivative output value, the adder 455 assigns (at 530) a weight to each of the three output values 440-450, which were provided by their respective calculators 425-435. In some embodiments, the adder 455 (at 530) assigns a weight between zero percent and one hundred percent for each of the output values.

Once the weights have been assigned (at 530), the adder 455 computes (at 535) an adjustment factor (e.g., adjustment output 255) based on the weighted output values 440-450 and ends. Some embodiment use Equation (1), described in Section III, to compute the adjustment factor and ends. In some embodiments, the adder 455 further provides the adjustment factor (e.g., adjustment output 255) to the frame rate adjuster 220 of FIG. 2. In some embodiments, the adjustment factor is used to define the frame sampling rate during an encoding operation.

One skilled in the art will realize that the invention is not limited to a video conference application. Some embodiments of the invention may be advantageously implemented in any video encoding environment. The invention is particularly useful in a real-time video encoding environment. In such an environment, the encoding is performed in real time typically in conjunction with several other processes that are running on the encoding computer. The invention allows the real time encoder to adjust its frame sampling rate with changes in the use of the computational resources of the encoding computer. For instances, as the number of processes that run on the encoding computer increases, the invention allows the encoder to reduce its frame sampling rate in order to be able to complete its encoding operation.

While the invention is described using the system idle time, some embodiments of the invention may also use other metrics that quantify the system usage of a processor of the computer (e.g., system processing time).

IV. Computer

Figure 6:
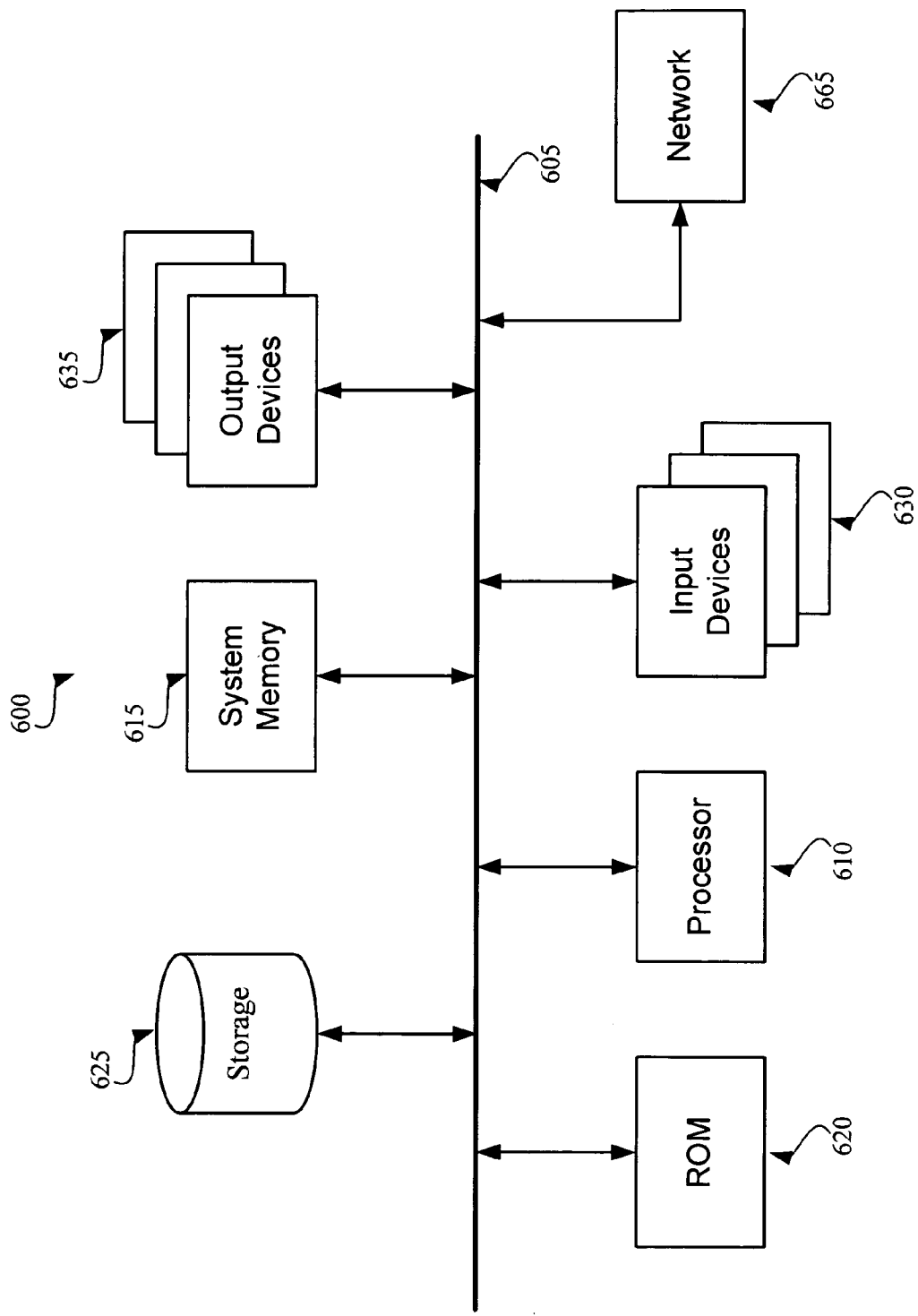
FIG. 6 conceptually illustrates a computer system that is used to implement some embodiments of the invention.

FIG. 6 conceptually illustrates a computer with which some embodiments of the invention are implemented. Computer 600 includes a bus 605, a processor 610, a system memory 615, a read-only memory 620, a permanent storage device 625, input devices 630, and output devices 635.

The bus 605 collectively represents all system, peripheral, and chipset buses that support communication among internal devices of the computer 600. For instance, the bus 605 communicatively connects the processor 610 with the read-only memory 620, the system memory 615, and the permanent storage device 625.

From these various memory units, the processor 610 retrieves instructions to execute and data to process in order to execute the processes of the invention. The read-only-memory (ROM) 620 stores static data and instructions that are needed by the processor 610 and other modules of the computer. The permanent storage device 625, on the other hand, is a read-and-write memory device. This device is a non-volatile memory unit that stores instruction and data even when the computer 600 is off. Some embodiments of the invention use a mass-storage device (such as a magnetic or optical disk and its corresponding disk drive) as the permanent storage device 625. Other embodiments use a removable storage device (such as a floppy disk or zip® disk, and its corresponding disk drive) as the permanent storage device.

Like the permanent storage device 625, the system memory 615 is a read-and-write memory device. However, unlike storage device 625, the system memory is a volatile read-and-write memory, such as a random access memory. The system memory stores some of the instructions and data that the processor needs at runtime. In some embodiments, the invention's processes are stored in the system memory 615, the permanent storage device 625, and/or the read-only memory 620.

The bus 605 also connects to the input and output devices 630 and 635. The input devices enable the user to communicate information and select commands to the computer. The input devices 630 include alphanumeric keyboards and cursor-controllers. The output devices 635 display images generated by the computer. The output devices include printers and display devices, such as cathode ray tubes (CRT) or liquid crystal displays (LCD).

Finally, as shown in FIG. 6, bus 605 also couples computer 600 to a network 665 through a network adapter (not shown). In this manner, the computer can be a part of a network of computers (such as a local area network ("LAN"), a wide area network ("WAN"), or an Intranet) or a network of networks (such as the Internet). Any or all of the components of computer 600 may be used in conjunction with the invention. However, one of ordinary skill in the art will appreciate that any other system configuration may also be used in conjunction with the invention.

While the invention has been described with reference to numerous specific details, one of ordinary skill in the art will recognize that the invention can be embodied in other specific forms without departing from the spirit of the invention. For instance, the frame rate adjuster and the PID control system are described for a multi-participant video conferencing. However, both the frame rate adjuster and the PID control system can be implemented in a participant-to-participant video conferencing. Thus, one of ordinary skill in the art would understand that the invention is not to be limited by the foregoing illustrative details, but rather is to be defined by the appended claims.

What is claimed is:

1. A method for adjusting a video sampling rate that is used during a video encoding operation of a multi-participant video conference, the method comprising:
at a computing device of a first participant of said video conference:
defining an initial video sampling rate for determining the rate at which a composite video of said video conference is generated;
receiving video content of at least said first participant and a second participant of said conference;
receiving a metric that quantifies the usage of the computing device that performs the video encoding operation;
computing an adjustment factor based on the metric;
redefining the video sampling rate based on the adjustment factor; and
based on the redefined video sampling rate, encoding said composite video comprising said video content of said first and second participants.

2. The method of claim 1, wherein the computing of the adjustment factor comprises using a proportional integral derivative ("PID") operation to compute the adjustment factor based on the received metric.

3. The method of claim 2, wherein the PID operation performs a proportional calculation, an integral calculation, and a derivative calculation, and combines results of said calculations through a set of weighting factors.

4. The method of claim 3, wherein at least one weighting factor in the set of weighting factors is set to zero.

5. The method of claim 1, wherein the computing of the adjustment factor comprises using a non-linear calculation to compute the adjustment factor based on the received metric.

6. The method of claim 1, wherein the metric comprises a system idle of the computing device.

7. The method of claim 6, wherein the system idle is an idle percentage of a processor of the computing device.

8. The method of claim 6, wherein the video sampling rate is not redefined when the system idle is above a certain threshold value.

9. The method of claim 6, wherein the video sampling rate is redefined when the system idle is above a certain threshold value.

10. The method of claim 6, wherein the video sampling rate is redefined when the system idle is below a certain threshold value.

11. A computer readable storage medium storing a computer program which when executed by one or more processors adjusts a video sampling rate that is used during a video encoding operation of a multi-participant video conference, the computer program comprising sets of instructions for:
at a computing device of a first participant of said video conference;
defining an initial video sampling rate for determining the rate at which a composite video is generated;
receiving video content of at least said first participant and a second participant of said conference;
receiving a metric that quantifies the usage of the computing device that performs the video encoding operation;
computing an adjustment factor based on the metric;
redefining the video sampling rate based on the adjustment factor; and
based on the redefined video sampling rate, encoding said composite video comprising said video content of said first and second participants.

12. The computer readable storage medium of claim 11, wherein the set of instructions for computing of the adjustment factor comprises a set of instructions for using a proportional integral derivative ("PID") operation to compute the adjustment factor based on the received metric.

13. The computer readable storage medium of claim 12, wherein the PID operation performs a proportional calculation, an integral calculation, and a derivative calculation, and combines results of said calculations through a set of weighting factors.

14. The computer readable storage medium of claim 13, wherein one or more of weighting factors in the set of weighting factors is set to zero.

15. The computer readable storage medium of claim 11, wherein the set of instructions for computing of the adjustment factor comprises a set of instructions for using a non-linear calculation to compute the adjustment factor based on the received metric.

16. The computer readable storage medium of claim 11, wherein the metric comprises a system idle of the computing device.

17. The computer readable storage medium of claim 16, wherein the system idle is an idle percentage of a processor of the computing device.

18. The computer readable storage medium of claim 16, wherein the video sampling rate is not redefined when the system idle is above a certain threshold value.

19. The computer readable storage medium of claim 16, wherein the video sampling rate is redefined when the system idle is above a certain threshold value.

20. The computer readable storage medium of claim 16, wherein the video sampling rate is redefined when the system idle is below a certain threshold value.

21. The method of claim 1 further comprising encoding the video content at the redefined sampling rate.

22. The method of claim 1, further comprising distributing the video content to a set of non-focus devices in the video conference, said metric quantifying the usage of the computing device.

23. The method of claim 1, wherein said metric comprises the usage of a processor of said computing device that performs the video encoding operation.

24. A method for adjusting a video sampling rate that is used during a video encoding operation of a multi-participant video conference, the method comprising:
   at a computing device of a participant, which serves as one of a central distributor and a non-central distributor of video content during the multi-participant video conference:
   determining a metric that quantifies processor usage of said computing device that performs the encoding during the video conference;
   computing an adjustment factor based on the metric;
   adjusting the video sampling rate based on the computed adjustment factor;
      when the computing device serves as the central distributor, encoding composite video content for other non-central distributors based on the adjusted sampling rate; and
      when the computing device serves as the non-central distributor, encoding video content for another central distributor based on the adjusted sampling rate.

25. The method of claim 24, wherein the computing of the adjustment factor comprises using a proportional integral derivative ("PID") operation to compute the adjustment factor based on the determined metric.

26. A computer-implemented method for encoding frames of a video conference, said method comprising:
   at a computing device of a participant, which serves as one of a central distributor and a non-central distributor of video content during the multi-participant video conference:
   providing a control system for receiving a usage metric that quantifies the usage of the computing device that performs the encoding during the video conference and computing an adjustment factor based on the usage metric;
   providing a frame rate adjuster for receiving the adjustment factor and generating a frame sampling rate; and
   providing a video encoding module for receiving the generated frame sampling rate and encoding video of the video conference according to the generated frame sampling rate, wherein the video encoding module encodes the video for other non-central distributors when the computing device serves as the central distributor, and encodes the video for another central distributor when the computing device serves as the non-central distributor.

27. The computer-implemented method of claim 26, wherein said frame rate adjuster is further for receiving a reference input that represents a minimum threshold for said usage metric.

28. The computer-implemented method of claim 26, wherein said usage metric comprises at least one of system idle time and system processing time.

29. The computer-implemented method of claim 26, wherein said control system is farther for computing an error value by calculating the difference between the usage metric and a reference input that represents a minimum threshold for said usage metric.

30. The computer-implemented method of claim 29, wherein said control system is further for computing from said error value at least one of a proportional output value, an integral output value, and a derivative output value.

31. The computer-implemented method of claim 30, wherein said control system computes said adjustment factor by summing the proportional, integral, and derivative output values.

32. The computer-implemented method of claim 30, wherein said usage metric comprises at least one of system idle time and system processing time.

33. The computer-implemented method of claim 26, wherein the computing of the adjustment factor comprises using a proportional integral derivative ("PID") operation to compute the adjustment factor based on said usage metric.

* * * * *

UNITED STATES PATENT AND TRADEMARK OFFICE
CERTIFICATE OF CORRECTION

PATENT NO.         : 7,653,250 B2                                         Page 1 of 1
APPLICATION NO. : 11/118554
DATED              : January 26, 2010
INVENTOR(S)        : Jeong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 739 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,653,250 B2 | Page 1 of 1 |
| APPLICATION NO. | : 11/118554 | |
| DATED | : January 26, 2010 | |
| INVENTOR(S) | : Hyeonkuk Jeong et al. | |

It is certified that error appears in the above-identified patent and that said Letters Patent is hereby corrected as shown below:

In column 4, line 52, delete "Proporational" and insert -- Proportional --, therefor.

In column 8, line 30, in Claim 11, delete "conference;" and insert -- conference: --, therefor.

In column 9, line 12, in Claim 22, delete "claim 1," and insert -- claim 1 --, therefor.

In column 10, line 27, in Claim 29, delete "farther" and insert -- further --, therefor.

Signed and Sealed this
Eleventh Day of October, 2011

David J. Kappos
*Director of the United States Patent and Trademark Office*